April 22, 1969     H. V. COCHRAN     3,440,603

VEHICLE ACCELERATION INDICATING DEVICE

Filed July 8, 1966     Sheet _1_ of 2

INVENTOR.
HERMAN V. COCHRAN
BY
Dunlap and Laney
ATTORNEYS

April 22, 1969    H. V. COCHRAN    3,440,603
VEHICLE ACCELERATION INDICATING DEVICE
Filed July 8, 1966    Sheet 2 of 2

INVENTOR.
HERMAN V. COCHRAN
BY
Dunlap and Laney
ATTORNEYS

United States Patent Office 3,440,603
Patented Apr. 22, 1969

3,440,603
VEHICLE ACCELERATION INDICATING DEVICE
Herman V. Cochran, 7245 NW. 21st St.,
Bethany, Okla. 73008
Filed July 8, 1966, Ser. No. 563,884
Int. Cl. B60q 1/26; G01p 15/04
U.S. Cl. 340—52                                    15 Claims This invention relates to a device for indicating vehicular acceleration and deceleration. More specifically, but not by way of limitation, the present invention relates to a device which can be employed on racing automobiles to visually indicate to the driver the precise time at which the gears of the transmission system of the automobile should be shifted in order to cover the course of the race in the minimum time.

A number of so-called G-meters, accelerometers, and inertia actuated switches have heretofore been proposed in various environments and for various uses. In substantially all of these devices, the actuation of the device occurs through the movement of a first mass relative to a second by a change in the inertia of the system in which both masses are located. Thus, for example, it has been proposed in Bacon U.S. Patent 2,244,417 to employ an inertia register in automobiles and other vehicles for the purpose of providing a visual indication of an undesirably high rate of acceleration or deceleration during the operation of the vehicle. In the Bacon inertia register, spherical elements move in an arcuate channel or tube under the influence of the vehicle's acceleration or deceleration so as to move against a target element which, in turn, closes an electrical circuit when the spherical elements are moved by a sufficient degree due to a high rate of acceleration or deceleration. The Bacon inertia register functions quite well for its intended purpose of illuminating lights visible to the operator of the vehicle at such times as the vehicle is accelerated or decelerated at a rate which is higher than optimum. For this purpose, a rather coarse control is required and, in the simple system which is proposed, no provision is made for changes in various conditions under which the vehicle might be operated, such as, unevenness of tire inflation causing a departure of the ball receiving channel from its normal orientation to the horizontal, the use on the vehicle of power brakes, or the employment of the vehicle in special circumstances for sporting purposes, such as racing.

A system which is generally similar in structure, but which operates on a different principle, is disclosed in U.S. Patent 1,611,219 to Minninger. In the Minninger automatic engine cutout device for use on tractors, an inclined cylindrical tube contains a steel ball which is moved in the cylindrical tube when the orientation of the chassis of the tractor with respect to the ground changes. If the tractor rears up on its traction wheels to a point where its orientation with respect to the ground becomes precarious or dangerous, the ball in the tube rolls to a point where an electrical circuit is shorted by the ball and the ignition system of the tractor engine is de-energized. The traction wheels of the tractor are thus deactivated and the rearing or bucking of the tractor is thereby suppressed. The tube within which the steel ball is located is pivotally supported for pivotation about a horizontal axis so that its inclination to the horizontal may be changed to meet different demands whenever required.

The present invention combines in a novel and inventive way the broad principles disclosed in the Minninger and Bacon patents to solve a problem which has confronted drivers of racing vehicles in obtaining maximum efficiency in the operation of their vehicles so as to cover the course of the race in a minimum time. In most types of automobile racing, the automobile must be shifted from one gear ratio to another one or more times during the course of the race, and the time at which such shifting is accomplished is all-important in the attainment of the object of completing the race in the minimum time. Thus, under optimum conditions of operation, the gears of the racing vehicle will be shifted immediately after maximum acceleration is reached in each gear ratio, or at least before a decline in the acceleration occurs. Although acceleration meters and tachometers have previously been employed for the purpose of indicating to racing drivers an optimum time at which to shift gears, these devices have not been too practical. In the case of the tachometers, there is no direct correlation between acceleration of the vehicle and shifting of the gears and, in the case of the acceleration meters or G-meters, a numerical indication of the forces of acceleration on a meter which must be scrutinized by the driver and comprehended in order to be of any benefit is a less than optimum arrangement for it distracts the driver and prevents his concentration on other important conditions in his environment which are frequently more critical than the knowledge of the optimum time to shift gears. Too, devices of the type described have always made no provision for variations in racing conditions which affect the accelerating characteristics of the car. Because of the described deficiencies of devices which have been previously used for the purpose of informing the driver of the time for shifting gears, racing drivers have frequently ignored such devices and have relied primarily on the "feel" of the car or the manner in which their own bodies respond to forces of acceleration to accomplish the necessary shifting. This can be a reliable method only when the driver has acquired a vast amount of experience, and even then it is frequency deceptive and usually does not result in the shifting being accomplished in an optimum manner. The present invention provides an easily perceptible and easily comprehended visual signal which is actuated upon the attainment of a certain level of acceleration by a racing vehicle, with such signal being energized by a very sensitive inertia actuated switch. The device may be adjusted to compensate for a number of variables encountered in racing so that for a given race under given conditions, the driver of the racing vehicle can be assured that the visual signal accurately indicates the precise time when shifting should be carried out.

Broadly described, the present invention comprises an elongated channel having an axis inclined with respect to the horizontal and rollably supporting a spherical member which is positioned in the elongated channel for rolling movement therealong. A stop means is secured to the channel and is positioned in the path of rolling movement of the spherical member for limiting movement of the spherical member in the channel. Switch means is secured to the channel in the path of rolling movement of the spherical member and is spaced along the axis of the channel from the stop means. An electrical circuit which includes the switch means is provided, and also includes an electrically energized light which is adapted to be positioned within the view of the operator of a vehicle upon which the device is located. Finally, means is provided for adjustably varying the inclination with respect to the horizontal of the axis of the elongated channel.

The means which is provided for adjustably or selectively varying the inclination of the axis of the elongated channel with respect to the horizontal is an important feature of the present invention. This strucure permits the point in time during the race at which the light is energized to be varied to compensate for variations in conditions under which the race is conducted. Thus, as merely one illustration of its use, in instances where the front or rear tires of the vehicle are inflated in a way which differs from one race to the next, the incline of the elongated channel which is fixed to the vehicle chassis will also vary, and this change in inclination must be offset or compensated by the described inclination varying structure. Other racing conditions may also change so as to require such an adjustment, including the surface of the road over which the race is run, the type of fuel used, the temperature prevailing at the time of the race and many other factors which affect the acceleration rate of the engine.

From the foregoing broad description of the invention, it will have become apparent that it is a major object of of the invention to provide an easily used, accurate acceleration indicating device which is specially adapted for use on racing vehicles which must shift gears at least once in the course of the race.

Another object of the invention is to provide an acceleration responsive instrument which is simple in construction and capable of reliably providing a visual indication of the time at which a vehicle on which it is mounted reaches maximum acceleration.

An additional object of the invention is to provide an acceleration indicating device which can be easily and quickly adjusted to provide a visual signal at a time when a vehicle on which it is mounted attains a precise, pre-selected acceleration.

Another object of the invention is to provide an acceleration responsive instrument which is mechanically strong and affected by the vibration of a racing vehicle on which it is mounted to a minimum degree.

In addition to the foregoing described objects and advantages, additional objects and advantages will become apparent as the following detailed description of the invention is read in conjunction with the accompanying drawings which illustrate the invention.

Figure 1:
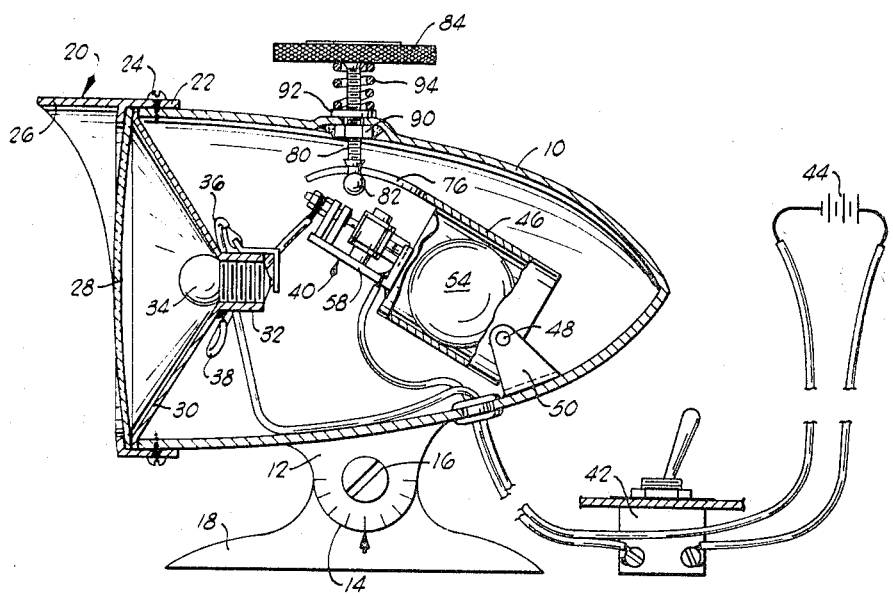
FIGURE 1 is a sectional view of one embodiment of the invention.

Referring now to the drawings in detail, and particularly, to FIGURE 1, the acceleration indicator of the invention includes a housing 10 which has welded, or otherwise suitably secured thereto, a downwardly depending ear 12 which has an arcuately curved lower edge 14 carrying graduations indicative of the inclination with respect to the horizontal of the housing 10 and the elements which are disposed therein. A set screw 16 extends through an aperture in the ear 12 and connects the ear and its associated housing 10 with a pedestal 18. The pedestal 18 carries apertures (not seen) or other suitable means permitting it to be secured to the dashboard or other surface disposed within the cab of a vehicle of the type adapted for racing.

Secured across the open front of the housing 10 is a lens retaining element designated generally by reference character 20. The lens retaining element 20 has an apertured annular flange 22 which permits it to be secured by suitable screws 24 to the housing 10, and also has a visor 26 which extends forwardly of the housing 10 for the purpose of directing light as hereinafter explained. Secured to the open forward end of the housing by the lens retaining element 20 is a lens 28 of conventional type such as those used in flashlights and the like for focusing a beam of light originating from a relatively small source. The peripheral edge of the lens 28 bears against a conically shaped bulb housing 30 which carries a threaded tubular portion 32 into which a light bulb 34 is threaded in the usual fashion. The light bulb 34 is connected by suitable leads 36 and 38 in an electric circuit which includes inertia switch means designated generally by reference numeral 40 and an on-off toggle switch 42. A source of electrical power 44 is also connected in the circuit and may be a battery provided specifically for use with the invention, or may be the storage battery provided on automobiles.

The inertia switch means 40 which is provided in the electrical circuit includes channel means which, in the illustrated embodiment, assumes the form of a cylindrical or tubular housing 46 which is connected by a pin 48 located near one end thereof to a supporting bracket 50. The supporting bracket 50 is substantially U-shaped in configuration so that opposite ends of the pin 48 are received in the legs of the bracket, and the pin extends transversely across the tubular housing 46. The pin 48 thus forms a positive stop for a relatively large spherical member 54 which is rollably positioned in the tubular housing 46, and which is preferably of only slightly smaller diameter than the housing so as to prevent the spherical member from bouncing or vibrating in the tubular housing.

Figure 3:
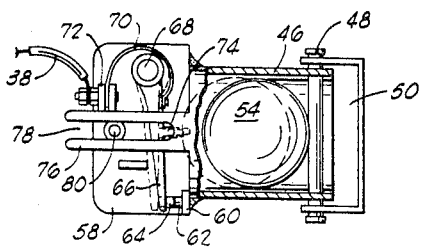
FIGURE 3 is a detail view illustrating the arrangement of an electrical switch used in the embodiment of the invention depicted in FIGURES 1 and 2.

In the preferred embodiment of the invention, the spherical member 54 is a steel ball. Other materials of construction can be provided, however, provided only that they are characterized in having a relatively high density and thus affording a significant mass. At the opposite end of the tubular housing 46 from its end through which the pin 48 is passed, a switch support plate 58 is welded to the end edges of the tubular housing 46 and extends outwardly therefrom as shown in FIGURE 1. A stationary contact support post 60 is welded to the switch support plate 58, and extends substantially normal thereto in the plane in which the tubular housing 46 terminates and to one side of the housing as shown in FIGURE 3. The contact post 60 carries a fixed contact 62 secured to the post near its upper end. A movable contact 64 is mounted on the free end of a cantilevered switch arm 66. The switch arm 66 is pivotally supported on a switch arm post 68 and is biased toward the tubular housing 46 by a spring metal, electrically conducting member 70. An electrical conductor (not seen) is extended along the switch arm 66 between the terminus of the spring metal member 70 and the movable contact 64. The opposite end of the spring metal member 70 is clamped in a post 72 and connected to the conductor 38 as best illustrated in FIGURE 3. As will be noted in referring to FIGURE 3, the spherical member 54 is free to roll to the illustrated dashed line position and, in this position, it strikes a non-conducting protuberance 74 affixed to the movable switch arm 66 and causes this arm to move away from the tubular housing 46, and thus separate the contacts 62 and 64. This opens the electrical circuit to the light 34 to provide a visual indication of the attainment of a certain level of eccleration as hereinafter explained.

Figure 2:
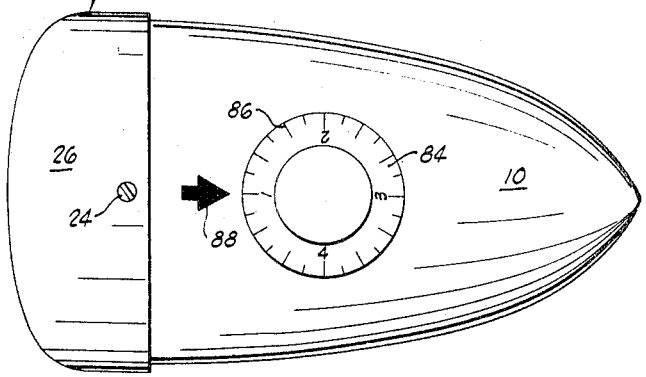
FIGURE 2 is a plan view of the embodiment of the invention illustrated in FIGURE 1.

To facilitate the adjustment of the inclination with respect to the horizontal of the tubular housing 46, the housing carries a bifurcated arcuate finger 76 at its upper side, such finger extending forwardly in the housing 10 over the inertia switch means 40. An elongated slot 78 is provided in the bifurcated finger 76 and receives a shaft 80 which carries on one end thereof, a small ball 82 of larger diameter than the transverse dimension of the slot 78. The shaft 80 is threaded over a major portion of its length and is secured at its end opposite the end carrying the ball 82 to a knurled adjusting dial 84. As illustrated in FIGURE 2, the knurled adjusting dial 84 is provided with a series of graduations or indicia 86 adjacent its outer periphery, and these indicia can be appropriately aligned with a pointer 88 provided on the housing 10 so as to permit the operator of the racing vehicle to selectively adjust the inclination of the tubular housing 46 in accordance with particular conditions which prevail during a race as usually empirically determined. The threaded shaft 80 extends through a nut 90 secured to the housing 10 and through a washer 92 which is provided outside the housing. A compression spring 94 extends between the washer 82 and the adjusting dial 84 and serves to maintain tension in the threaded shaft 80 so that the threads thereof will constantly bear against, and frictionally engage, the threads of the nut 90. As a result of this arrangement, the adjusting dial 84 will be retained in its selected position, and the inclination of the tubular housing 46 cannot be varied as a result of vibration forces set up in the vehicle during the course of the race.

OPERATION

In utilizing the acceleration indicating device of the invention, after the base or pedestal 18 has been mounted in a desired location within the cab of the vehicle, such as on the top of the dashboard, and the electrical circuit has been connected to a suitable source of electrical energy, the on-off toggle switch 42 is utilized to place the device in service. Except when the vehicle is being used for racing and it is desired to make use of the visual signal which is provided by the device, it will normally be desirable to open the electrical circuit by throwing the switch 42 so as to avoid distracting the driver with the light 34, and to avoid unnecessarily using current from the battery 44.

In the operation of the acceleration indicating device, the lens 28 faces rearwardly in the vehicle or toward the driver with the tapered end of the housing 10 being oriented toward the front end of the vehicle. From the start of the race, the vehicle is accelerated rapidly and this causes the spherical member 54 to be displaced by a rolling motion away from the positive stop formed by the pin 48 and toward the inertia switch means 40. Two opposing forces, of course, act on the spherical member 54, one being that due to the inertia of the spherical member, and the other being the gravitational influence on the spherical member tending to maintain it at the lowest point within the tubular housing 46. At such time as the acceleration reaches a magnitude sufficient to overcome the gravitational influence on the spherical member 54, it will move along the tubular housing 46 and will move against the protuberance 74 carried by the movable switch arm 66 and cause the contacts 62 and 64 to be separated. Thus, at this time, assuming that the on-off switch 42 has been closed, the circuit will be opened and the light 34 will de-energized.

Once the maximum acceleration of the vehicle is reached, which will be at some point in time during the use of each gear ratio in which the vehicle is driven, and upon the first instance following the attainment of such maximum acceleration when deceleration commences, the spherical member 54 will move downwardly in the inclined tubular housing 46 under the influence of gravity, and will move away from the protuberance 74 of the movable switch arm 66. This movement will thus permit the contacts 62 and 64 to again be brought together with the result that the electrical circuit will be closed, and the light 34 will be energized. At this time, the operator is immediately visually appraised of the fact that he has attained the maximum acceleration which is attainable in the particular gear in which he is then driving, and that continued driving in that gear will not be effective to deliver maximum attainable torque from the engine of the racing vehicle to the wheels. He instantly knows, therefore, that the time has arrived at which he should shift to the next gear ratio, and this procedure can be immediately accomplished.

Upon shifting to the next gear ratio, the car is able to further accelerate from the speed or velocity which it has reached in the first gear ratio, and the sequence of turning off the light and then turning it on when maximum acceleration is reached is again repeated. In actuality, the maximum acceleration which can be achieved in each gear ratio will be different in almost every instance, so that the acceleration indicating device will not be accurate through a sequence of several shifts. In the event that it is desired to provide a very accurate indication of the time to shift during several sequential changes in gear ratio, it is preferred, and often necessary, to provide a plurality of acceleration indicating devices of the type described with each of the devices being pre-set or calibrated to respond to the optimum acceleration which is attainable with each separate gear ratio which will be used. This arrangement will be discussed in greater detail hereinafter.

In vehicle races depending to a relatively great extent upon acceleration, such as in drag racing, the conditions which are experienced in different races are variable to the extent that it is highly desirable to provide a means for accurately and effectively adjusting the sensitivity of the acceleration indicating device so that it will respond to different magnitudes of acceleration. Since the particular level of acceleration at which the spherical member 54 rolls upwardly in the tubular housing 46 and separates the contacts 62 and 64 is dependent upon the inclination of the tubular housing 46, variations in racing conditions which make it necessary to alter the magnitude of the acceleration at which the device will respond will require an ability to change the inclination of the tubular housing 46 with respect to the horizontal. In the present invention, this is accomplished with the adjusting dial 84. Thus, by rotation of the adjusting dial 84, the operator can elevate or lower the bifurcated finger 76 so as to cause pivotation of the tubular housing 46 about a horizontal axis extending in the pin 48. The manner in which the adjusting dial 84 and its associated threaded shaft 80 are constructed assures that relatively fine adjustments of the inclination of the tubular channel 46 can be effected, and also assures that vibratory forces which are frequently present in large magnitude under racing conditions do not cause a departure from the desired setting of inclination which characterizes the tubular housing 46.

There are many factors or conditions which may be mentioned as requiring an adjustment in the inclination with respect to the horizontal of the tubular housing 46. For example, an alteration in the type of tires carried on the rear wheels of the racing vehicle and in the extent to which such tires are inflated will necessarily result in a variation in the inclination of the chassis of the vehicle with respect to the horizontal. This in turn will develop a similar variations in the inclination of the tubular housing 46 with respect to the horizontal, and will change the magnitude of acceleration to which the spherical member 54 will respond sufficiently to open the contacts 62 and 64. Under a condition of this type, and assuming the same basic acceleration characteristics in the vehicle, it will be necessary to make a compensating adjustment in the position of the tubular housing 46 with respect to the chassis of the vehicle, and this is accomplished with the adjusting dial 84.

To mention another situation which might require adjustment of the inclination of the tubular housing 46, a racing driver might determine that by a change in the type of fuel employed, more power could be developed by the engine and a greater magnitude of acceleration attained. Under these circumstances, the driver would undoubtedly wish to slightly elevate the bifurcated finger 76 and thus further increase the inclination of the tubular housing 46 with respect to the horizontal. This would then permit a smaller differential to exist between the gravitational force acting on the spherical member 54, and the maximum acceleration reached so that the light 34 will be energized instantly upon a slight decrease in acceleration from the maximum value attained using the new and improved fuel.

Changes in the inclination of the tubular housing 46 of the type described will generally be worked out or determined by the driver in an empirical fashion. In most instances, a number of practice runs over the course of the race will be carried out prior to the actual race against competition. This will permit the driver to make the optimum setting on the adjusting dial to permit the race to be run in the minimum time. In connection with the feature of adjustability which characterizes the present invention, it should be also mentioned that a coarse adjustment of the inclination of the tubular housing 46 with respect to the horizontal is afforded by the pivotal engagement between the ear 12 and the base or pedestal 18. It will be noted that the semi-circular or curved lower edge 14 of the ear 12 carries graduations which can be aligned with a suitable pointer or arrow on the base 18 to allow a coarse adjustment of inclination to be effected. Generally, however, an adjustment of inclination made by movement of the housing 10 relative to the base or pedestal 18 will be primarily for the purpose of adjusting the manner in which the light 34 is oriented with respect to the eyes of the vehicle driver.

Figure 4:
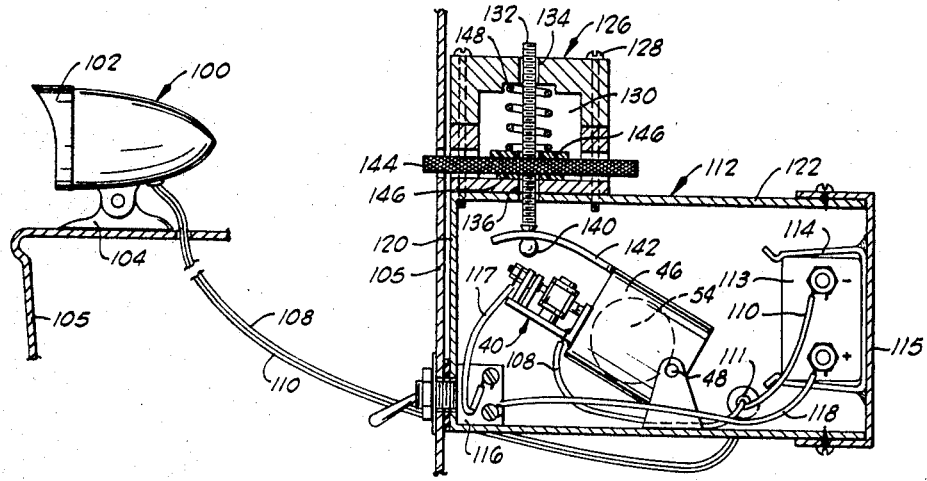
FIGURE 4 is a view partially in section and partially in elevation of a modified embodiment of the invention.
Figure 5:
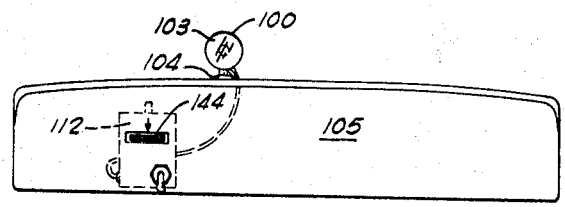
FIGURE 5 is a schematic view illustrating the manner in which the invention may be mounted on the dashboard of a racing vehicle.

A modified embodiment of the invention and the manner in which this embodiment is mounted on the dashboard within the cab of the racing vehicle are illustrated in FIGURES 4 and 5. In this embodiment of the invention, a housing 100, which is geometrically similar to, but substantially smaller than, the housing 10 depicted in FIGURE 1, is provided and includes a visor 102 and lens 103. A light bulb is also provided behind the lens in the same arrangement as previously described, and provides a visual signal within the field of view of the vehicle operator. The housing 100 and its associated pedestal 104 are mounted on the top of the dashboard 105 in the general fashion schematically illustrated in FIGURE 5, and the leads 108, 110 from the light bulb within the housing 100 are extended through the housing and through an opening 111 into a box 112 adapted to be mounted behind the dashboard 105 in the manner schemtaically illustrated in FIGURE 5.

In this embodiment of the invention, electric lead 110 extends from the opening 111 in the box 112 to a battery 113 which is retained in the box 112 by a spring bracket 114 secured to the back wall 115 of the box 112. Lead 108 is connected to inertia switch means 40. An on-off toggle switch 116 is connected by leads 117 and 118 to the inertia switch means 40 and to the battery 113, and the on-off switch is mounted so that its toggle extends through the front wall 120 of the box 112 and through the dashboard 105 and is accessible to the operator. The box 112 can be secured behind the dashboard 105 by any suitable means, such as screws, welding or the like, and carries secured to an upper panel 122 thereof, a shaft enclosure 126. The shaft enclosure 126 is illustrated as being secured to the box 112 by a plurality of elongated bolts 128. The shaft enclosure 126 has a hollow interior 130, and is provided with an elongated threaded shaft 132 which extends through a guiding aperture or channel 134 in the top of the shaft enclosure and through an aperture 136 in the bottom thereof and into the hollow interior of the box 112. At its lower end, the threaded shaft 132 carries a ball 140 which is of larger diameter than the slot provided in a bifurcated finger 142 of the type hereinbefore described. The bifurcated finger 142 is secured to the tubular housing 46 hereinbefore described which contains a spherical member 54 and functions in the manner previously discussed.

An adjusting dial 144 is threaded on the threaded shaft 132 and is positioned between two bearing washers 146 which are constructed of a high density synthetic resin having a low coefficient of friction. The bearing washers 146 permit easy turning movement of the adjusting dial 144 and, in conjunction with a compression spring 148, retain the adjusting dial in its illustrated position. The adjusting dial 144 extends through registering apertures in the shaft enclosure 126 and in the dashboard 105 so that the adjusting dial may be rotated by the thumb of the vehicle driver. The adjusting dial 144 carries on its upper surface, a series of indicia graduations and these may be aligned with a suitable arrow or other index marker on the dashboard 105 of the vehicle. By rotation of the adjusting dial 144, the threaded shaft 132 is caused to move upwardly or downwardly in the shaft enclosure 126 with the result that the bifurcated finger 142 and its associated tubular housing 46 are caused to pivot about the pivot pin 48 and thus adjust the inclination of the housing 46 with respect to the horizontal. The sensitivity of the accelerating indicating device can thus be adjusted to yield optimum performance under varying racing conditions.

The embodiment of the invention which is illustrated in FIGURES 4 and 5 possesses an advantage over the embodiment illustrated in FIGURES 1–3 in that the inertia switch 40 and the tubular housing 46 and the associated elements of the assembly can be located remotely with respect to the housing 100 containing the light bulb which provides the actual visual indication to the driver of the time at which maximum acceleration is reached and the gears are to be shifted. Thus, the box 112 can be positioned behind the dashboard as shown in FIGURE 5, or located under the hood of the vehicle or at any other location which is most convenient. It should be pointed out that if it should be desired to use an adjusting dial and compression spring of the type depicted in FIGURE 1 in conjunction with the box 122 illustrated in FIGURE 4, such an arrangement can be easily constructed and is more easily used where the adjusting valve is more accessible from a vertical direction than from ahead of the box 112 as when the box is mounted immediately behind the dashboard.

Figure 6:
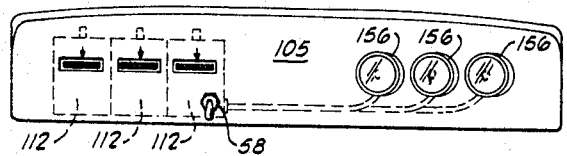
FIGURE 6 is a schematic illustration of another way in which the invention is used in combination with a racing vehicle by mounting the elements of the invention on the dashboard of the vehicle.

As has been previously pointed out, it will frequently be the case that a single acceleration indicating device will not provide an accurate indication of the optimum time to shift gears during each of the several shifts which normally must be made during the course of a race. This is, of course, due to the fact that acceleration forces vary in their magnitude in each of the gear ratios in which the vehicle may be driven, and proper response by a single acceleration indicating device for one of the gear ratios will normally not be a proper response in the case of the other gear ratios. In order to provide maximum efficiency enabling optimum shifting over the course of a race which requires shifting gears several times, a plural indicator arrangement of the type depicted in FIGURE 6 is preferably employed. As illustrated in this figure of the drawings, a plurality of the boxes 112 are provided, each containing an individually set inertia switch means 40 and associated tubular housing and rollably supported spherical member. Each of the inertia switch means within the several boxes 112 is individually connected to a light bulb contained in suitable housings, such as those designated by reference numeral 156 and shown as mounted in the dashboard 105 in FIGURE 6. In this arrangement, of course, a common on-off toggle switch 158 can be provided in the electrical circuitry so that the entire system may be switched off or disconnected from electrical power through the use of a single switch. With the described arrangement, each of the three acceleration indicating devices which are provided can be individually set to respond to the maximum acceleration attained in each of three different gear ratios used during the driving of the race. the lenses provided in each of the housings 156 to protect the light bulbs therein will preferably be of different colors so that an operator will be visually apprised of the time at which he is to shift gears during the several sequences of the race by the illumination of different colors.

From the foregoing description of the invention, it is believed that it will have become apparent that the invention provides a relatively simply constructed, yet mechanically stable acceleration indicating device which can function effectively to indicate visually to an operator the precise time at which the gear ratio employed in driving a racing vehicle should be changed by shifting gears. The device is not deleteriously affected by ordinary vibration stresses set up in the mechanical parts of the automobile during the running of the race, and is highly versatile in its utility in that it can be pre-set to respond to different magnitudes of acceleration, and thus can be used effectively for racing under different conditions or in different automobiles.

What is claimed is:

1. An acceleration indicating device comprising:
   an elongated channel having an axis inclined with respect to the horizontal;
   means for adjusting the inclination of the channel with respect to the horizontal and retaining said channel in the attitude to which adjusted;
   a spherical member rollably positioned in the channel for straight linear rolling movement therealong;
   a stop means positioned in the channel in the path of rolling movement of the spherical member for limiting the movement of the spherical member in the channel;
   switch means secured to the channel in the path of rolling movement of the spherical member and spaced horizontally along the channel from said stop means and on the other side of the spherical member therefrom;
   an electrically energized illuminable element; and
   electrical circuitry including said switch means and said illuminable element.

2. An acceleration indicating device as defined in claim 1 and further characterized to include:
   a housing enclosing said channel, switch means and illuminable element;
   a bracket pivotally supporting said channel in said housing for pivotation about a horizontal axis; and
   a pedestal pivotally connected to, and supporting, said housing and adapted for attachment to a vehicle.

3. An acceleration indicating device as defined in claim 2 wherein said means for adjusting the inclination of the channel with respect to the horizontal comprises:
   a threaded shaft extended through the top of said housing and connected at one of its ends to one end of said elongated channel; and
   an adjusting dial secured to the other end of said threaded shaft and external of said housing whereby rotation of said adjusting dial threads said shaft further into or out of said housing and elevates or lowers said channel.

4. An acceleration indicating device as defined in claim 1 wherein said channel is an open ended tubular housing and said spherical member is a steel ball.

5. An acceleration indicating device as defined in claim 2 wherein said stop means comprises a pivot pin extending across said channel and through said bracket.

6. An acceleration indicating device as defined in claim 1 wherein said switch means comprises a fixed contact secured to one end of said channel;
   a movable switch arm extending transversely across said channel;
   a movable contact on one end of said movable switch arm and aligned with said fixed contact;
   a protuberance secured to said movable switch arm at a point intermediate its length and in the path of rolling movement of said spherical member; and
   a spring connected to said movable switch arm and biasing said movable switch arm to a position in which said fixed and movable contacts touch each other.

7. An acceleration indicating device as defined in claim 1 wherein said electrical circuitry further includes an on-off switch.

8. An acceleration indicating device as defined in claim 1 and further characterized to include:
   a housing enclosing said illuminable element;
   a lens in said housing adjacent said illuminable element;
   a visor at one end of said housing around said lens for focusing light rays from said illuminable element;
   means for pivotally securing said housing to a flat surface; and
   a box located remotely from said housing and connected thereto only by said circuitry, said box enclosing said channel and switch means, and supporting said adjusting means.

9. An acceleration indicating device as defined in claim 6 wherein said channel is an open ended tubular housing, said spherical member is a steel ball, and said stop means is a pivot pin extending transversely across said tubular housing, and said device is further characterized to include a U-shaped bracket receiving said pivot pin and pivotally supporting said tubular housing for pivotation about a horizontal axis.

10. In combination with a vehicle of the type having a dashboard and a plurality of transmission gear ratios,
    an electric light mounted on the dashboard for perception by an operator of the vehicle;
    an elongated channel;
    a spherical member rollably mounted in the channel;
    means for pivotally supporting said channel on the vehicle for pivotation about a horizontal axis;
    stop means positioned in the channel in the path of rolling movement of the spherical member for arresting movement of the spherical member in one direction;
    switch means positioned for contact by said spherical member as it rolls away from said stop means;
    means for adjustably pivoting said elongated channel on said supporting means to vary the inclination of said channel to the horizontal in a selective manner causing said spherical member to contact said switch means only when said vehicle attains its maximum acceleration in a selected transmission gear ratio; and
    electric circuitry including said switch means and said electric light.

11. The combination defined in claim 10 and further characterized to include a plurality of electric lights mounted on said dashboard and corresponding in number to the number of transmission gear ratios provided on said vehicle, said lights being connected in said electrical circuitry;
    a plurality of elongated channels corresponding in number to the number of said lights;
    a spherical member rotatably mounted in each of said channels;
    means for individually supporting each of said channels on the vehicle for separate and selective pivotation about a horizontal axis;
    stop means positioned in each of said channnels in the path of rolling movement of the respective spherical member for arresting movement of the spherical member in one direction;
    a plurality of switch means corresponding in number to the number of said elongated channels and each mounted on, and movable with, one of said elongated channels, each of said switch means being connected in said electrical circuitry; and
    means for selectively and individually pivoting each of said elongated channels on its respective supporting means to vary the inclination of each of the channels to the horizontal in a selected manner to cause the spherical member in the respective channels to contact said switch means only when said vehicle attains its maximum acceleration in a selected transmission gear ratio.

12. The combination defined in claim 11 and further characterized to include an on-off switch in said circuitry for simultaneously connecting and disconnecting all of said lights from all of said switch means.

13. The combination defined in claim 10 wherein said light is mounted in a housing pivotally supported on said dashboard; and the remaining elements of said combination except said gear ratios and circuitry are disposed in an enclosure mounted behind said dashboard.

14. The combination defined in claim 13 wherein said enclosure comprises:

a box containing said channel, said means pivotally supporting said channel, and said switch means; and a threaded shaft enclosure;

and wherein said means for adjustably pivoting said elongated channel on said supporting means comprises:

an elongated, arcuate bifurcated finger secured to said chanel at one end thereof and positioned in said box;

an elongated threaded shaft having one of its ends engaging said finger and extending through said box to the outside thereof and into said threaded shaft enclosure; and an adjusting dial mounted in said threaded shaft enclosure for rotation about a vertical axis and threadedly engaging said shaft for moving said shaft into or out of said box upon rotation of said adjusting dial.

15. The combination defined in claim 12 wherein each of said switches comprises:

a fixed contact secured to one end of the respective channels;

a movable switch arm extending transversely across the respective channel;

a movable contact on one end of said movable switch arm and aligned with said fixed contact;

a proturberance secured to said movable switch arm at a point intermediate of the length thereof and in the path of rolling movement of the spherical member rollably supported in the respective channel; and a spring conected to said movable switch arm and biasing said switch arm to a position in which said fixed and movable contacts touch each other.

References Cited
UNITED STATES PATENTS 2,921,999  1/1960  Ziegler _____ 73—514 XR
2,997,557  8/1961  Gillmor et al. _____ 200—61.45

ALVIN H. WARING, *Primary Examiner.*

U.S. Cl. X.R.

73—498, 517; 200—61.45; 340—66, 262